May 19, 1970  P. PORTAL  3,512,450
MACHINE TOOLS

Filed Oct. 7, 1966  5 Sheets-Sheet 1

INVENTOR
PIERRE PORTAL
BY
Bacon & Thomas
ATTORNEYS

May 19, 1970  P. PORTAL  3,512,450
MACHINE TOOLS
Filed Oct. 7, 1966  5 Sheets-Sheet 2
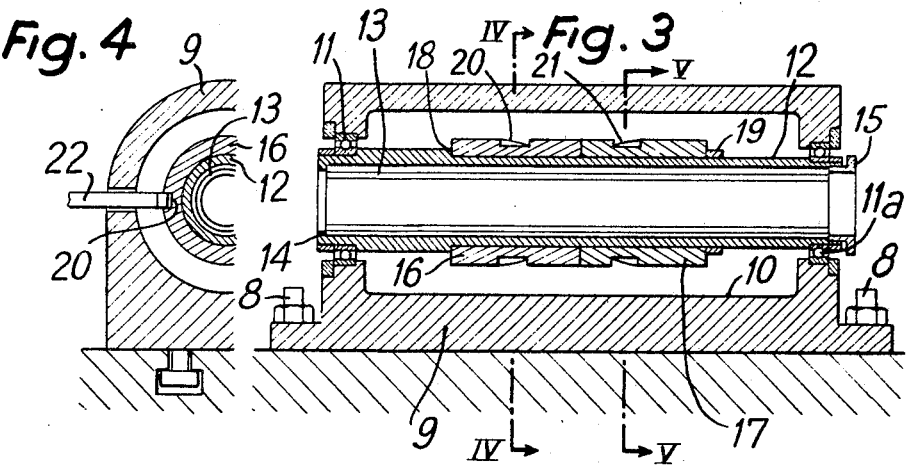
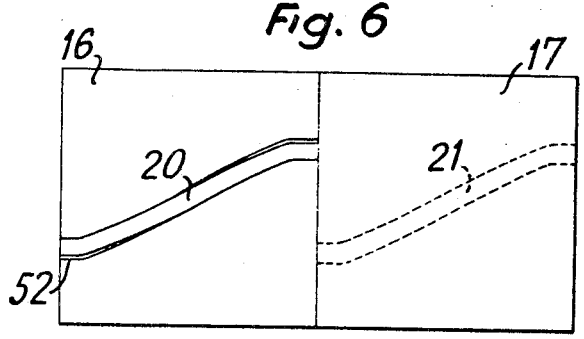
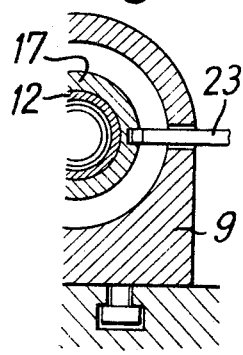
INVENTOR
PIERRE PORTAL
BY
Bacon & Thomas
ATTORNEYS

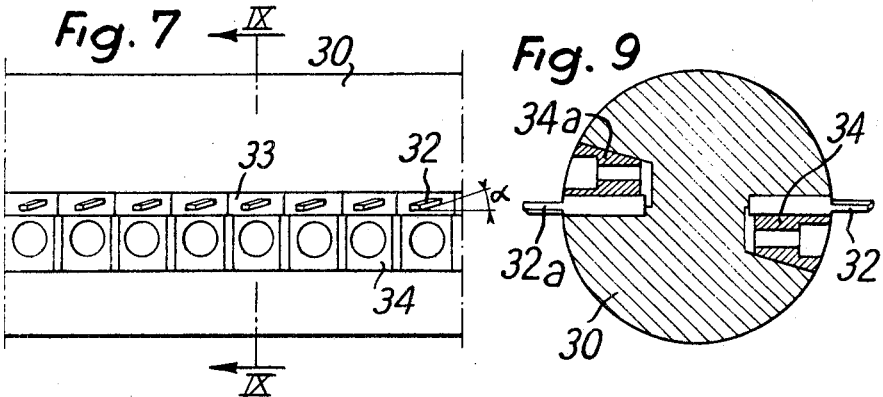
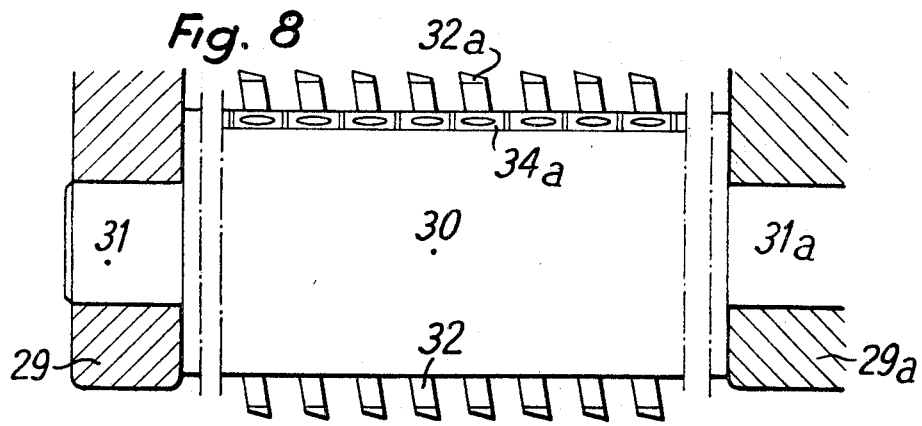

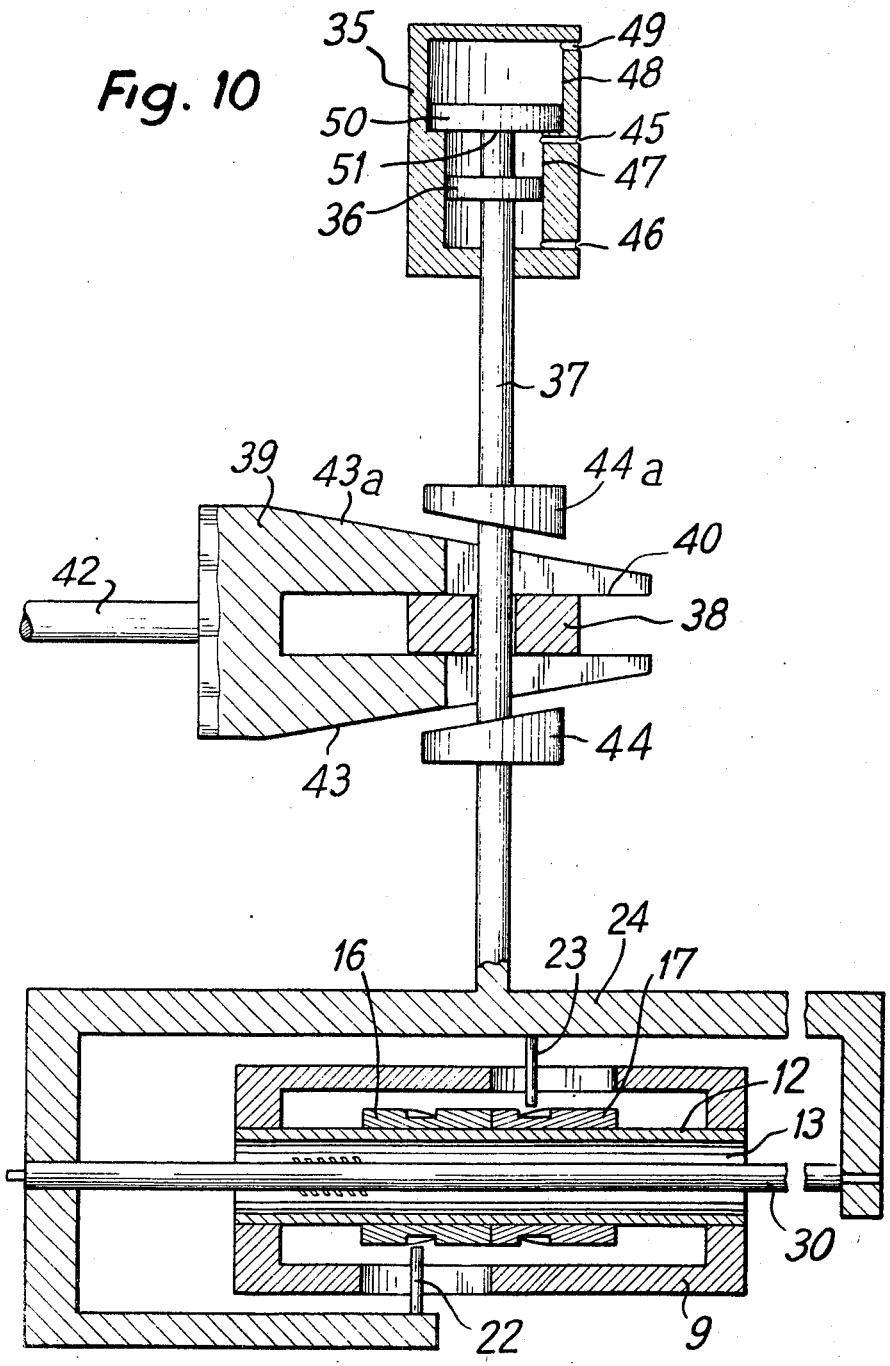

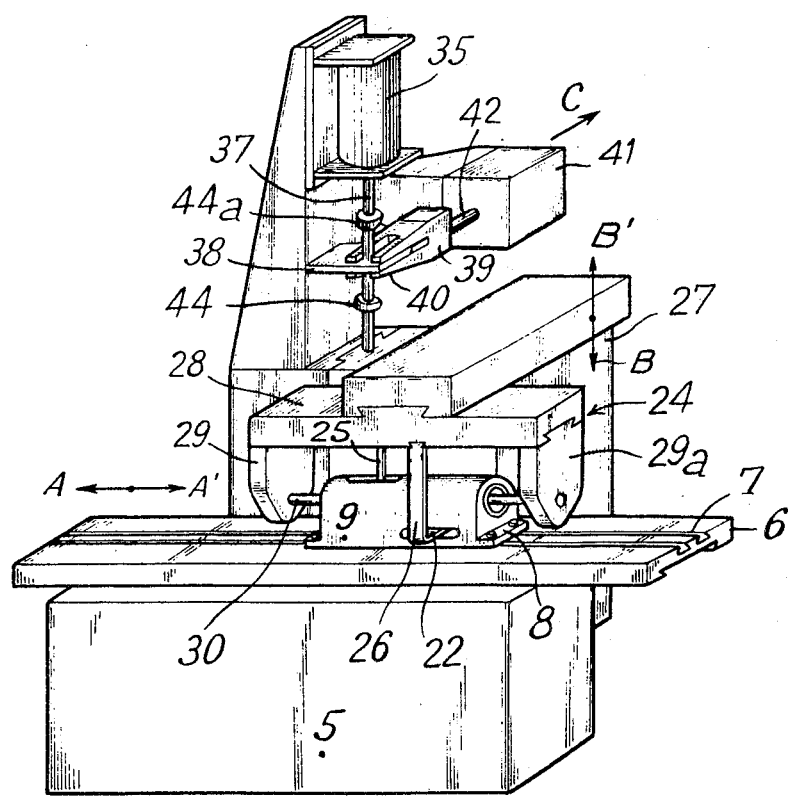

United States Patent Office 3,512,450
Patented May 19, 1970

3,512,450
MACHINE TOOLS
Pierre Portal, Bologne, France, assignor to Commissariat a l'Energie Atomique, Paris, France
Filed Oct. 7, 1966, Ser. No. 585,125
Claims priority, application France, Oct. 9, 1965, 34,411
Int. Cl. B23d 5/02
U.S. Cl. 90—28.1                                 7 Claims

ABSTRACT OF THE DISCLOSURE

A tubular element is supported for rotation on a reciprocating table with a tool carrying spindle, which is supported for movement laterally of the tube, extending therethrough. A cam track carried by the tube is engaged by a pin carried by the tool support for imparting a rotary movement to the tube upon reciprocation of the table and tube. Chevron-pattern grooves are cut on the inside wall of the tube by the cutting tools as the tube is simultaneously reciprocated and rotated past them.

---

The present invention relates to a machine tool for machining chevron-pattern grooves inside tubular elements.

The tubular elements capable of being used as sheaths intended to be located in tubular fuel elements of nuclear reactors, must have on their inside sets of fins for increasing their heat-exchange surface.

The tubular elements, which are usually made of a light metal or alloy, have inner sections separated by longitudinal grooves, these sections being machined so as to present helical chevron-pattern grooves with opposite helical pitch in two adjacent sections.

Fins delimited by two adjacent grooves are thus obtained, each fin generally being equal to each groove. This operation of cutting chevron grooves is effected after drifting or milling the longitudinal grooves and it presents machining problems due to the complexity of the grooves to be obtained and to the small space available inside the tubular element.

It is an object of the invention to provide a machine that permits these grooves to be machined with the desirable accuracy and at great speed, by machining all the grooves without dismounting the element.

It is a further object of the invention to dispose two sets of tools on a spindle locatable inside the tubular element and permitting two sets of radially opposite grooves of inverse pitch to be laternately machined.

The present invention, to this end, consists in a machine tool constituted by a fixed frame provided with a movable table and a movable tool-holding carriage moving alternately along a plane perpendicular to the direction of displacement of the table; a support being fixed to the table and receiving, in free rotation, a tubular element to be machined, whose axis is oriented in the direction of displacement of the table and in which is disposed a spindle fixed to the tool-holding carriage and provided with at least one set of cutting tools, the tubular element to be machined being secured to at least one cam in which at least one pin can be engaged, secured to the tool-holder whose alternate displacements are controlled by step by step advance means.

Other characteristics and advantages of the present invention will become apparent from the following description of some embodiments given solely by way of example, and with reference to the accompanying drawings, in which.

FIG. 3 shows a sectional and elevational view of the holder in which is disposed the tubular element to be machined, FIG. 4 shows a half view of the left hand section along the line IV—IV of FIG. 3, FIG. 5 shows a half view of the right hand section along the line V—V of FIG. 3, FIG. 6 shows an external view, on a larger scale, of of the cams secured to the tubular element to be machined, FIG. 7 shows an elevational view of the tool-holding spindle, FIG. 8 shows a plan view of the tool-holding spindle, FIG. 9 shows a sectional view along the line IX—IX of FIG. 7, FIG. 10 shows a plan view showing the device for controlling the tool-holding carriage, and FIG. 11 shows a perspective view of another embodiment of machine tool according to the invention in which the tool-holding carriage is vertically movable.

Figure 1:
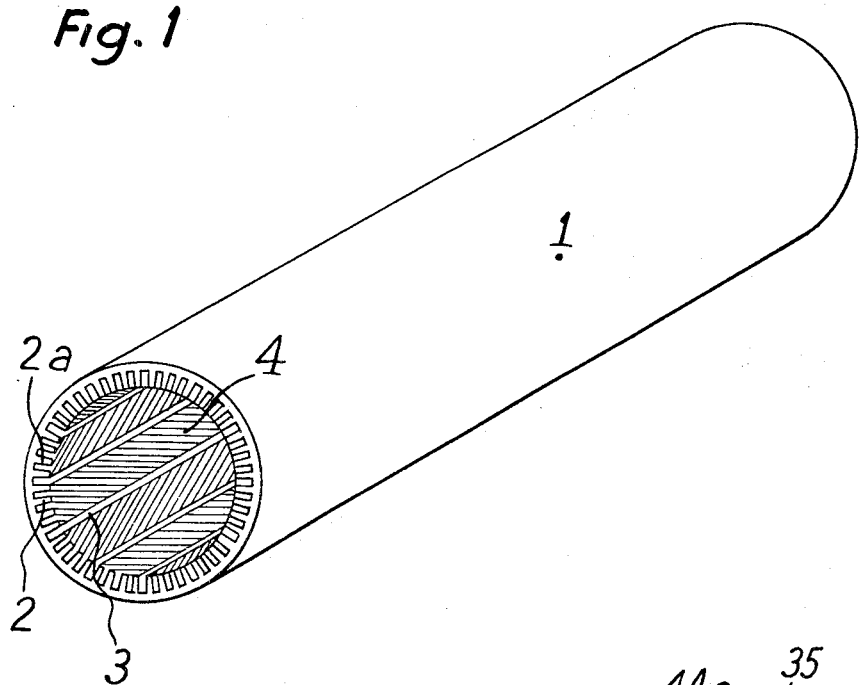
FIG. 1 shows a perspective view of a tubular element to be machined.

Referring now to the drawings, FIG. 1 shows a tubular element 1 after it has been machined, which has sections 2, 2a separated by longitudinal grooves 3, adjacent sectors 2, 2a being machined to present grooves 4 whose helical pitch is relatively opposite.

Figure 2:
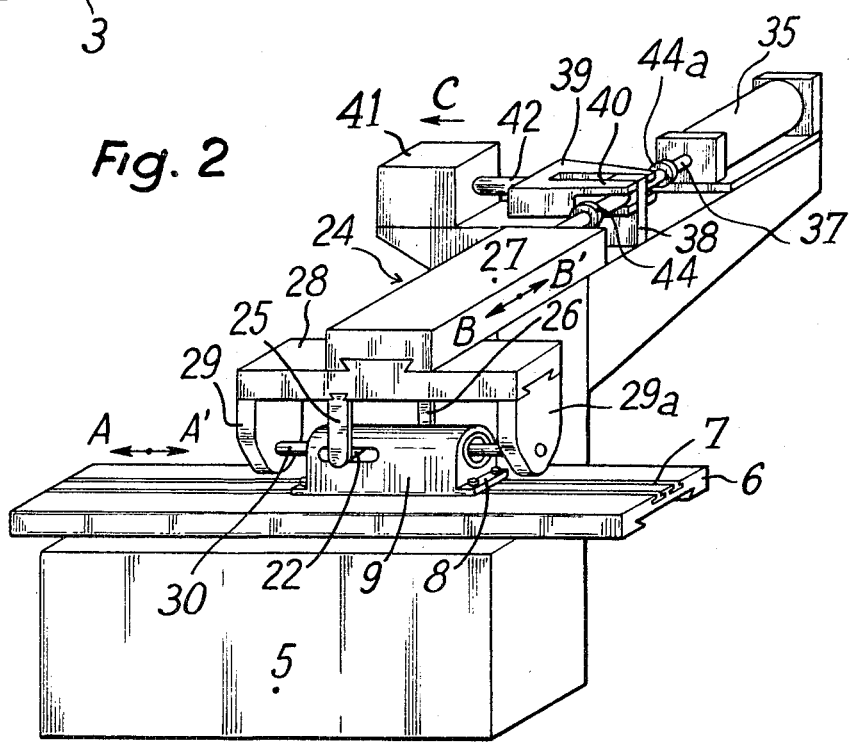
FIG. 2 shows a view of the whole of a machine tool according to the invention.

The grooves 4 are machined by means of a machine tool according to the invention, as shown in FIG. 2, which is constituted by a main fixed frame 5 on which is mounted a horizontal table 6 moving in a horizontal plane alternately following the double arrow A, A'. Said table is controlled by hydraulic or mechanical means in the manner of a known milling table. This table 6 has T-shaped grooves 7 in which are engaged bolts 8 by means of which a support 9 (FIGS. 3, 4, 5) is fixed to the table 6.

The support 9 has, internally, a bore 10 which comprises at its two ends bearings 11, 11a, constituted in particular by ball bearings which receive the ends of a sleeve 12 in which is mounted a tubular element 13 to be machined, in abutment on the one hand against a shoulder 14 and tightened on the other hand by a ring 15 screwed into the sleeve 12. The tubular element 13 to be machined is thus mounted to rotate freely in the support 9.

On the sleeve 12 and outside said latter are mounted, so as to be integral in rotation with said sleeve and with the tubular element 13, cams 16, 17, disposed one against the other, the cam 16 being in abutment against a shoulder 18 and cam 17 being tightened by a threaded ring 19 screwed onto a threaded part of the sleeve 12.

The cams 16 and 17 which are constituted by sleeves, have respectively on their external wall, grooves 20, 21, which are disposed symmetrically on either side of the axis of the tubular element 13.

In order to render the drawing more comprehensible, only one groove has been shown for each cam, but it is obvious that each cam may have a plurality of grooves.

In the grooves 20, 21 of the cams, pins 22, 23 are able respectively to be engaged, secured to a tool-holding carriage 24 to which they are respectively connected by support clips 25, 26. The pins 22, 23 are diametrically opposite with respect to the tubular element 13.

The tool-holding carriage 24 comprises a table 27 disposed in a plane parallel to that of the table 6 and moving perpendicularly to this latter in the direction of the double arrow B, B'. At one of its ends, the table 27 supports a cross piece 28 on which are fixed two flanges 29, 29a disposed symmetrically. The tool-holding carriage 24 thus constituted, supports by the flanges 29, 29a, a spindle 30 which is engaged inside the tubular element 13 mounted in the support 9. This spindle 30 is rigidly fixed at its two ends 31, 31a to the flanges 29, 29a and comprises two sets of tools 32, 32a which are diametrically opposite, with respect to the axis of the spindle (FIGS. 2, 7, 8, 9). The tools are engaged in longitudinal grooves 33 of the spindle and they are held by locking wedges 34, 34a or in any other known manner. Each set comprises as many tools as there are grooves 4 to be made in a tublar element 1.

The tools 32 are intended for cutting in particular the grooves of the right hand helix, whilst the tools 32a can cut the grooves of the left hand helix.

The tools 32, 32a are inclined with respect to the horizontal at an angle α equal to the angle of the mean helix of the grooves.

The tool-holding carriage 24 is actuated in the direction of the double arrow BB′ by any control device, but which is consituted in the embodiment shown in the drawing by a jack 35 fixed to the frame 1 and whose piston 36 (FIGS. 2 and 10) is connected to the table 27 of the tool-holding carriage 24 by a rod 37, traversing a guide member 38 secured to the frame 5.

On the guide member 38 there is mounted to slide a cam 39 having at one of its ends the shape of a double fork 40 which is engaged on the rod 37.

The cam 39 is displaced step by step in the direction of the arrow C perpendicularly to the direction of displacement of the rod 37 under the action of any linear divider 41, is connected to this latter by a rod 42.

The cam 39 has two inclined faces 43, 43a against which stop members 44, 44a come respectively into contact upon each alternate displacement of the carriage, whose travel is thus limited in dependence upon the step by step displacement of the cam 39 and of the inclinations of the faces 43, 43a.

The drive device constituted by the jack 35 which is controlled by a motive fluid acting on the two faces of the piston 36, has two inlet apertures 45, 46, opening out into a cylinder 47.

Another cylinder 48 fed by an aperture 49 receives a free piston 50 which is capable of acting against the end 52 of the rod 37 for controlling the carriage.

The machining of chevron grooves 4 inside a tubular element 1 (FIG. 1) on the machine tool according to the invention is effected in the following manner:

The tubular element 13 whose longitudinal grooves 3 were machined previously, is fixed inside the support 9 in the sleeve 12 as shown in FIGS. 3, 4, 5. The tool-holding carriage 24 is in the position shown in FIG. 10, the stops 44, 44a being situated respectively on either side of and at an equal distance from the faces 43, 43a of the cam 39.

The pins 22, 23, are released from the grooves 20, 21 of the cams 16 and 17, and the spindle 30 provided with its tools 32, 32a is introduced into the tubular element 13 and fixed to the tool-holding carriage 24.

The linear divider 41 is in its initial position.

Fluid is admitted into the cylinder 47 through the aperture 45 so that the piston 36 drives the tool-holding carriage 24 in the direction of the arrow B by the rod 37 until the stop 44a comes into contact with the face 43a of the cam. In its movement, the carriage 24 carrying the pin 23 engages the latter in the groove 21 of the cam 17.

The horizontal table 16 is then displaced in the direction of the arrow A thereby driving the support 9. By its longitudinal displacement, the cam 17 secured to the tubular element 13 is rotated by the action of the pin 23 which is fixed.

The result is that the tubular element 13 is helically moved and that the tools 32 remove a certain quantity of metal from a section 2 corresponding to a machine cut of the grooves.

The horizontal table 6 stops at the end of its travel when the tubular element 13 has rotated through a section 2, and the tool-holding carriage 24 is displaced in the opposite direction following the arrow B′ until the stop 44 comes into contact with the face 43 of the cam 39. This movement of the carriage 24 is obtained by admitting fluid through the aperture 46 of the jack 35.

In its reverse movement, the tools 32a are placed in position for machining a section diametrically opposite the section 2, and the pin 22 is engaged in the groove 30 of the cam 16.

The helical grooves 20, 21 have at their ends rectilinear parts 52 which guide the tubular element 13 longitudinally for a short distance without imparting rotation thereto after a machine cut at which time the tools 32 are disposed in one of the grooves 3.

The horizontal table 6 is then displaced in the opposite direction following the arrow A′ whilst causing a reverse helical movement of the tubular element 13, and so that the tools 32 cut a second set of helical grooves of direction opposite the first, from a section which is diametrically opposite the section 2.

The operation is thus repeated for all the sections of the tubular element until this latter has made a complete revolution which corresponds to a machine cut for all the sections.

After a revolution of the tubular element to be machined and in order to obtain deeper grooves, the linear divider 41 is then operated on, which displaces the cam 39 by a certain adjustable distance ε in the direction of the arrow C. The position taken by the stops 44, 44a at the end of their travel will thus occupy the preceding position plus a distance ε′ corresponding to the depth of cut desired for a planing cut.

It is thus possible to make as large a number of machine cuts as is desired, because upon each revolution of the tubular element to be machined, the linear divider 41 can be displaced by a division allowing the tool-holding carriage 24 a greater transverse displacement.

For the dismounting of the tubular element 13, the motive fluid is admitted through the apertures 46 and 49 so that the free piston 50 whose surface is greater than that of the piston 36 acts upon the end 51 of the rod 37 and guides the piston 36 into the position shown in FIG. 10, where the tool holder 24 occupies a median position permitting the release of the tools.

A machine tool has been shown which comprises two sets of tools 32, 32a and a control for the tubular element comprising two cams 16, 17, but it would obviously be possible to use, for the purpose of simplification, only a single set of tools and a single cam control.

On the other hand, as a modification, it would also be possible to fix the tool holder 24 on the table 6 and the support 9 on the transverse table 27.

In the embodiment shown in FIG. 11, the tool-holding carriage 24 is displaced perpendicularly to the horizontal table 6 in the direction of the double arrow B–B′, and to this end the control rod 37 and the jack 35 are disposed vertically and perpendicularly to the plane of the table 6. This arrangement is obtained by a rotation of 90° of the step by step advance means of the tool-holding carriage 24.

Although, the table 6 is mounted horizontally, it would also be possible to dispose it vertically by modifying the other components in consequence.

A machine tool according to the invention is applicable in particular to the machining of sheaths or tubes having internal fins intended for heat exchangers, either in nuclear reactors, or in any other device.

The main advantage of this machine is that it permits the production, in a single operation, of tubes which may or may not be helical, having internal chevron-pattern fins, without a subsequent second operation.

I claim:
1. A machine tool for machining chevron-pattern grooves inside a tubular workpiece, comprising a fixed frame provided with a movable table and a movable tool- holding carriage, means for moving said carriage alternatively along a plane perpendicular to the direction of displacement of the table, a support secured to said table, said support having means for receiving in free rotation a tubular workpiece to be machined whose axis is oriented in the direction of displacement of said table, a spindle fixed to the tool-holding carriage and passing through said tubular workpiece and being provided with at least one set of cutting tools, said cutting tools being engageable with the inside surface of said tubular workpiece, at least one cam being secured to said tubular workpiece, at least one pin secured to said movable tool-holding carriage and being engageable with said one cam for moving said tubular workpiece relative to said cutting tools, and advancing means to said tool-holder with a step by step motion for making deeper grooves in said tubular workpiece.

2. A machine tool according to claim 1, wherein the step by step advance means for said tool-holding carriage are constituted by a control member which is connected to said tool holding carriage by a rod, said rod carrying two stops co-operating respectively with two inclined planes of a cam, and linear divider means for moving said inclined cam along an axis perpendicular to that of said rod.

3. A machine tool according to claim 1, wherein said one cam secured to said tubular workpiece to be machined, is constituted by a sleeve having at least on its external surface a groove, in which at least one pin secured to the carriage is engageable, said groove having at its two ends a straight part parallel to the generatrices of the external surface of the sleeve for releasing the tools.

4. A machine tool according to claim 1, wherein two cams are secured to said tubular workpiece to be machined and co-operate with two pins disposed symmetrically on either side of said tubular workpiece.

5. A machine tool according to claim 1, wherein said spindle is provided with two sets of diametrically opposed tools, for the alternate machining of two sets of opposed grooves.

6. A machine tool according to claim 2, wherein said rod for said tool-holding carriage is situated in a plane parallel to the plane of said movable table.

7. A machine tool according to claim 2, wherein said rod for said tool-holding carriage is situated in a plane perpendicular to the plane of said movable table.

References Cited

UNITED STATES PATENTS

| | | | |
|---|---|---|---|
| 1,394,079 | 10/1921 | Fuchs | 90—28.1 X |
| 2,320,750 | 6/1943 | Raiche | 90—28.1 |
| 3,221,608 | 12/1965 | Anthony | 90—28.1 |

ANDREW R. JUHASZ, Primary Examiner

G. WEIDENFELD, Assistant Examiner

U.S. Cl. X.R.

90—29, 31